US008196780B2

(12) United States Patent
Ophardt et al.

(10) Patent No.: US 8,196,780 B2
(45) Date of Patent: Jun. 12, 2012

(54) ROTARY FOAM PUMP

(75) Inventors: Heiner Ophardt, Vineland (CA); Andrew Jones, Smithville (CA)

(73) Assignee: Gotohti.com Inc, Beamsville, CA (US)

( * ) Notice: Subject to any disclaimer, the term of this patent is extended or adjusted under 35 U.S.C. 154(b) by 626 days.

(21) Appl. No.: 12/320,498

(22) Filed: Jan. 27, 2009

(65) Prior Publication Data

US 2009/0200340 A1 Aug. 13, 2009

(30) Foreign Application Priority Data

Feb. 8, 2008 (CA) ...................................... 2620709

(51) Int. Cl.
*B67D 7/76* (2010.01)
*B67D 7/66* (2010.01)
*G01F 11/20* (2006.01)

(52) U.S. Cl. ..................... 222/190; 222/410; 222/383.2; 222/333; 222/271; 222/252; 222/255; 222/138; 222/139; 169/14; 239/427; 418/153

(58) Field of Classification Search .................. 222/410, 222/383.2, 333, 271, 264, 252, 255, 190, 222/135, 136, 138, 139; 169/14; 239/423, 239/427; 418/152, 153
See application file for complete search history.

(56) References Cited

U.S. PATENT DOCUMENTS 1,804,604 A * 5/1931 Gilbert ............................ 418/15
2,151,511 A * 3/1939 Hagen ............................ 406/63
2,827,858 A * 3/1958 Hesson ........................... 418/15
2,843,049 A * 7/1958 Sherwood ..................... 418/153
3,234,962 A * 2/1966 Williamson ............. 137/565.11
3,846,515 A * 11/1974 Williamson ................. 261/18.3
3,932,302 A * 1/1976 Eron ............................... 366/12
4,696,417 A * 9/1987 Ugolini ...................... 222/146.6
5,291,951 A * 3/1994 Morand .......................... 169/14
5,307,963 A * 5/1994 Mitchell ........................ 222/368
5,364,031 A * 11/1994 Taniguchi et al. ............ 239/330
5,836,482 A 11/1998 Ophardt et al.
5,837,168 A * 11/1998 Rowe ........................... 261/78.2
6,053,369 A * 4/2000 Hoang et al. .................. 222/190
6,086,052 A * 7/2000 Rowe ........................... 261/18.1
6,138,994 A * 10/2000 Rowe ........................... 261/18.1
6,217,009 B1 * 4/2001 Rowe ........................... 261/78.2
6,264,450 B1 * 7/2001 Woodruff ...................... 418/153
6,343,724 B1 2/2002 Ophardt et al.
6,409,050 B1 6/2002 Ophardt et al.
6,957,751 B2 10/2005 Ophardt
7,198,175 B2 4/2007 Ophardt
7,303,099 B2 12/2007 Ophardt
7,455,197 B2 11/2008 Ophardt
2001/0002976 A1 * 6/2001 Skill .......................... 417/410.3
2005/0139612 A1 6/2005 Matthews et al.

OTHER PUBLICATIONS

Wikipedia Online Dictionary http:\\en.wikipedia.org./wiki/rotary_vane_pump, Nov. 18, 2008.

* cited by examiner

*Primary Examiner* — Kevin P Shaver
*Assistant Examiner* — Nicholas Weiss
(74) *Attorney, Agent, or Firm* — Thorpe North & Western LLP

(57) ABSTRACT

The present invention provides a positive displacement rotary vane mixing pump in combination with a positive displacement rotary vane fluid pump. The mixing pump having an air inlet, an inlet for foamable fluid from the fluid pump, and an outlet from a discharge sector of the pump for discharging a mixture of air and liquid to a foam generator.

21 Claims, 12 Drawing Sheets

ROTARY FOAM PUMP

SCOPE OF THE INVENTION

This invention relates to foam dispensers for producing foamed fluids.

BACKGROUND OF THE INVENTION

Foaming pumps are known for foaming fluids and for producing a discharge of fluids mixed with air as foam. For example, it is known to mix air and liquid soap to provide foamed liquid hand soap.

The present inventors have appreciated that known systems for producing foam suffer the disadvantages that they are relatively complex and expensive.

SUMMARY OF THE INVENTION

To at least partially overcome these disadvantages of previously known devices, the present invention provides an inexpensive rotary vane pump arrangement to receive air and a foamable fluid and dispense the same as foam.

An object of the present invention is to provide a simple foam dispenser preferably to be driven by an electric motor in an automated touchless dispenser.

Another object is to provide an advantageous arrangement of a rotary vane pump for use in foaming of fluids.

Accordingly, in a first aspect, the present invention provides a positive displacement rotary vane mixing pump with an air inlet and an inlet for foamable fluid and an outlet from a discharge sector of the pump for discharging a mixture of air and liquid to a foam generator. In a modification of the first aspect of the present invention, in accordance with a second aspect, the present invention provides for the foamable fluid to be injected through the fluid inlet into the mixing pump preferably from a fluid pump, most preferably, a coupled positive displacement rotary vane pump. In a modification of the second aspect of the present invention, rotors for the mixing pump and the fluid pump are preferably coupled and commonly driven.

In one aspect, the present invention provides a dispenser for dispensing foam comprising:

a positive displacement rotary vane mixing pump having:

a rotor chamber-forming member having an interior chamber defined by interior chamber walls, and a rotor journalled for rotation about a rotor axis inside the interior chamber;

the rotor having a plurality of vanes extending outwardly radially relative the rotor axis for engagement with the chamber walls;

the vanes extending from the rotor circumferentially spaced from each other about the rotor axis;

a plurality of vane chambers, each vane chamber formed between two respective adjacent vanes and the chamber walls;

wherein, in each rotation of the rotor about the rotor axis in the interior chamber, each pair of adjacent vanes passes through a suction sector of the interior chamber and a discharge sector of the interior chamber and wherein in movement of each two adjacent vanes through the suction sector the respective vane chamber increases in volume, and in movement of each two adjacent vanes through the discharge sector the respective vane chamber decreases in volume;

an air inlet into the suction sector of the interior chamber, an outlet from the discharge sector of the interior chamber, a fluid inlet into the interior chamber upstream from the discharge sector;

a reservoir for a fluid capable of foaming in communication with the fluid inlet of the mixing pump, the outlet in communication with a discharge opening, a foam generator between the outlet of the interior chamber and the discharge outlet which on air and the fluid passing through the foam generator produces foam.

More preferably, in accordance with the first aspect, the fluid inlet may be open to the suction sector of the interior chamber and/or a fluid pump is provided between the reservoir and the fluid inlet to inject fluid through the fluid inlet. The fluid pump preferably may comprise a positive displacement rotary vane fluid pump having:

a rotor chamber-forming member having an interior chamber defined by interior chamber walls, and a rotor journalled for rotation about a rotor axis inside the interior chamber;

the rotor having a plurality of vanes extending outwardly radially relative the rotor axis for engagement with the chamber walls;

the vanes extending from the rotor circumferentially spaced from each other about the rotor axis;

a plurality of vane chambers, each vane chamber formed between two respective adjacent vanes and the chamber walls;

wherein, in each rotation of the rotor about the rotor axis in the interior chamber, each pair of adjacent vanes passes through a suction sector of the interior chamber and a discharge sector of the interior chamber and wherein in movement of each two adjacent vanes through the suction sector the respective vane chamber increases in volume, and in movement of each two adjacent vanes through the discharge sector the respective vane chamber decreases in volume;

a fluid inlet into the suction sector of the interior chamber of the fluid pump in communication with the reservoir, a fluid outlet from the discharge sector of the interior chamber of the fluid pump in communication with the fluid inlet of the mixing pump.

BRIEF DESCRIPTION OF THE DRAWINGS

Further aspects and advantages of the present invention will occur from the following description taken together with the accompanying drawings in which.

DETAILED DESCRIPTION OF THE DRAWINGS

Figure 1:
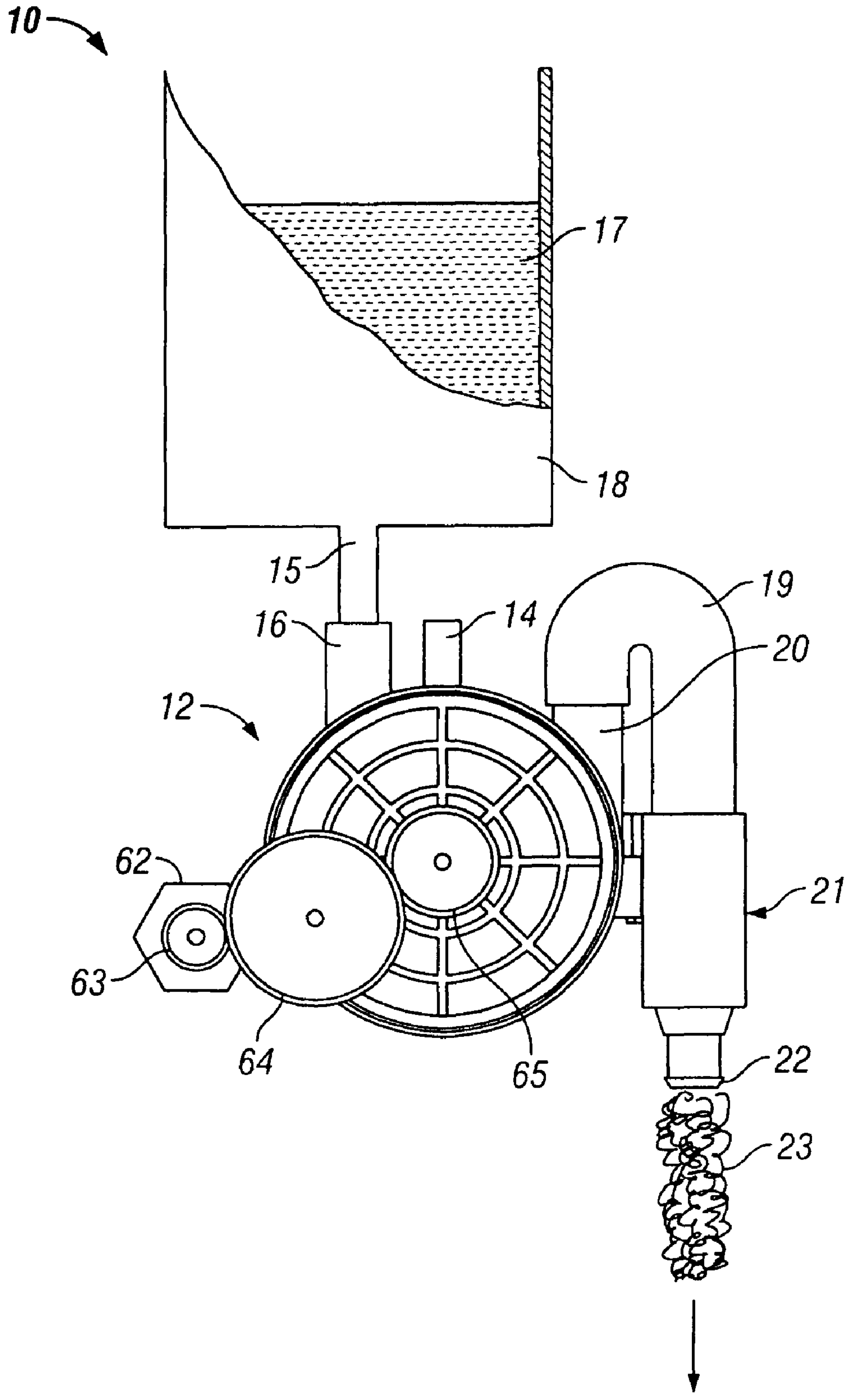
FIG. 1 is a schematic elevation view of a dispensing apparatus in accordance with a first embodiment of the present invention.

Reference is made first to FIGS. 1 to 6 which schematically illustrate a first embodiment of a foam dispensing apparatus 10 in accordance with the present invention. As shown, the foam dispensing apparatus 10 includes a mixing pump 12 having an air inlet 14 in communication with atmospheric air and a liquid inlet 16 in communication with foamable fluid 17 from a reservoir 18 via a fluid feed tube 15. The mixing pump 12 has an outlet 20 from which mixed air and liquid are discharged to pass through a foam generator 21 to produce foam 23 which is discharged out a discharge opening or outlet 22 for use.

Figure 2:
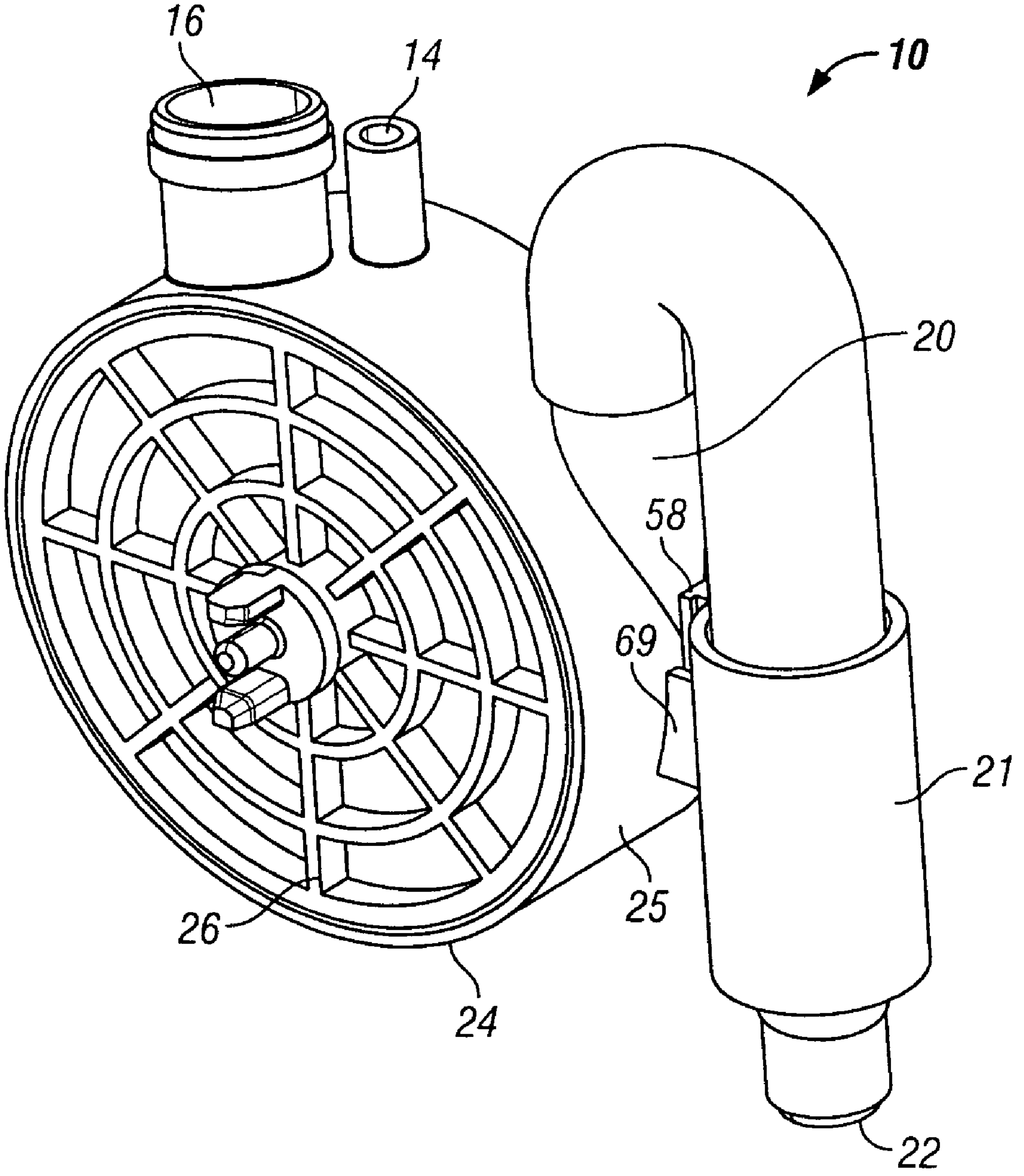
FIG. 2 is a pictorial front view of the mixing pump and foam generator of FIG. 1.
Figure 3:
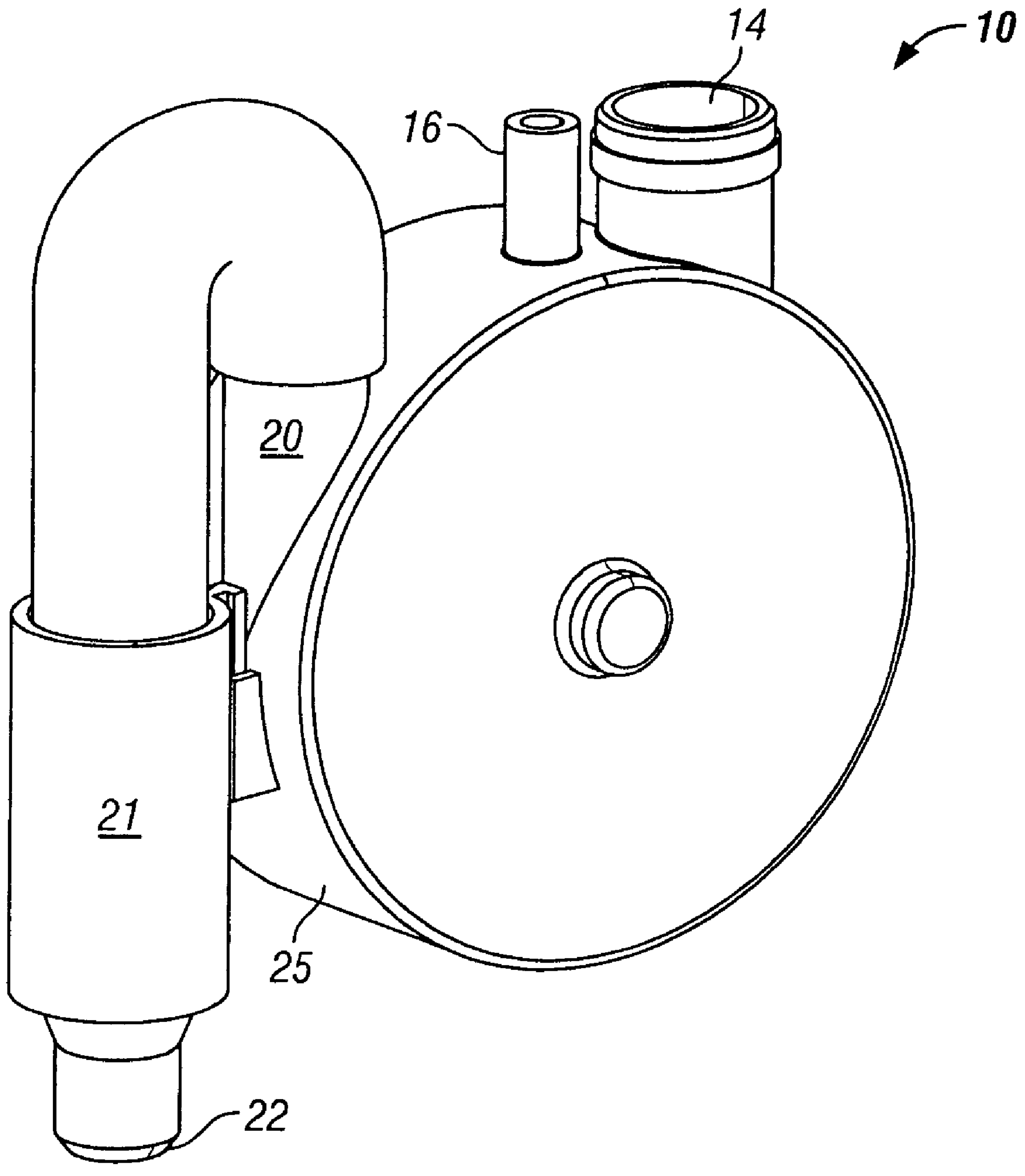
FIG. 3 is a perspective rear view of the mixing pump and foam generator of FIG. 2.
Figure 4:
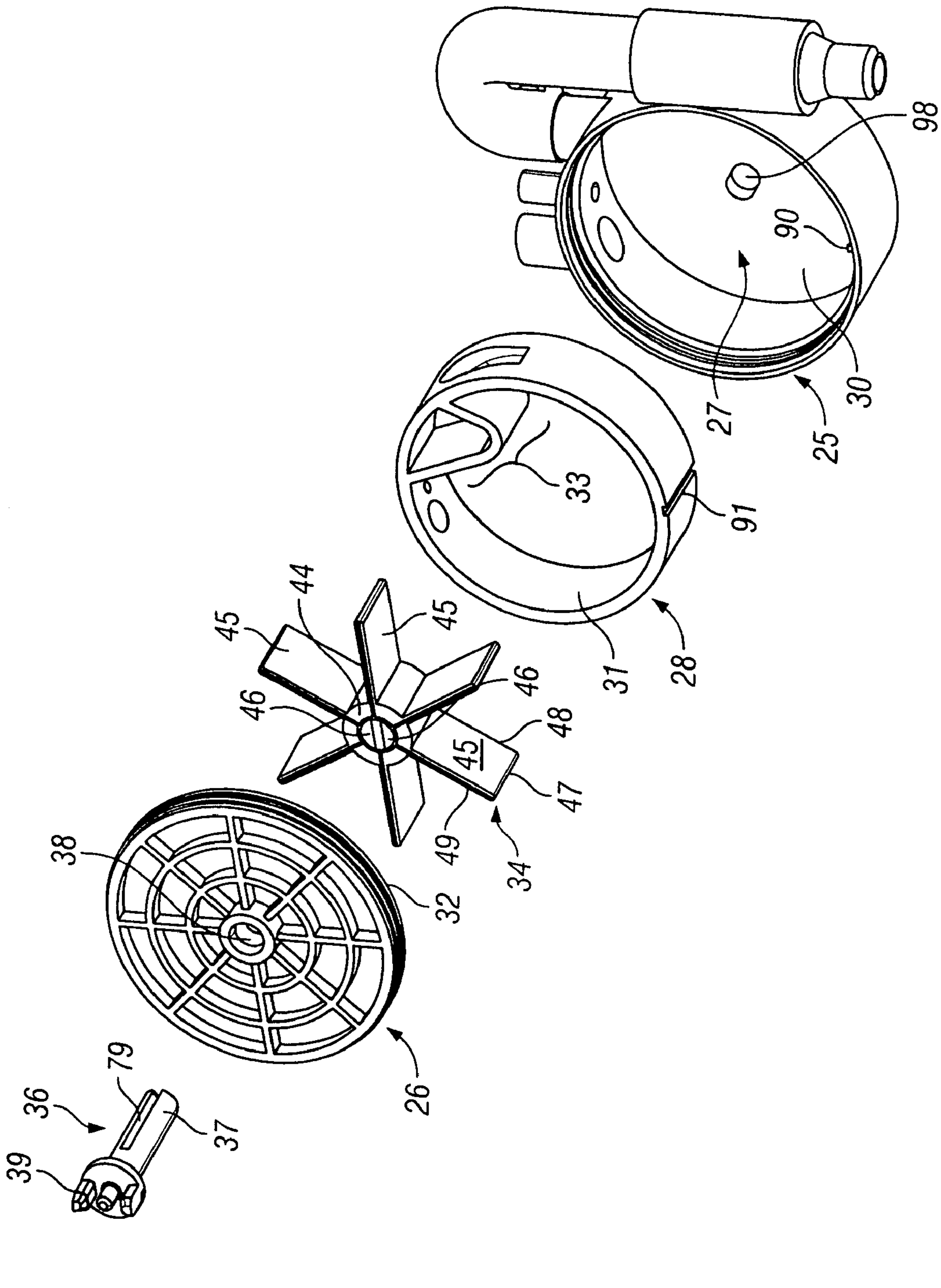
FIG. 4 is a rear view similar to that shown in FIG. 2 but with the mixing pump shown with its elements in an exploded view.
Figure 5:
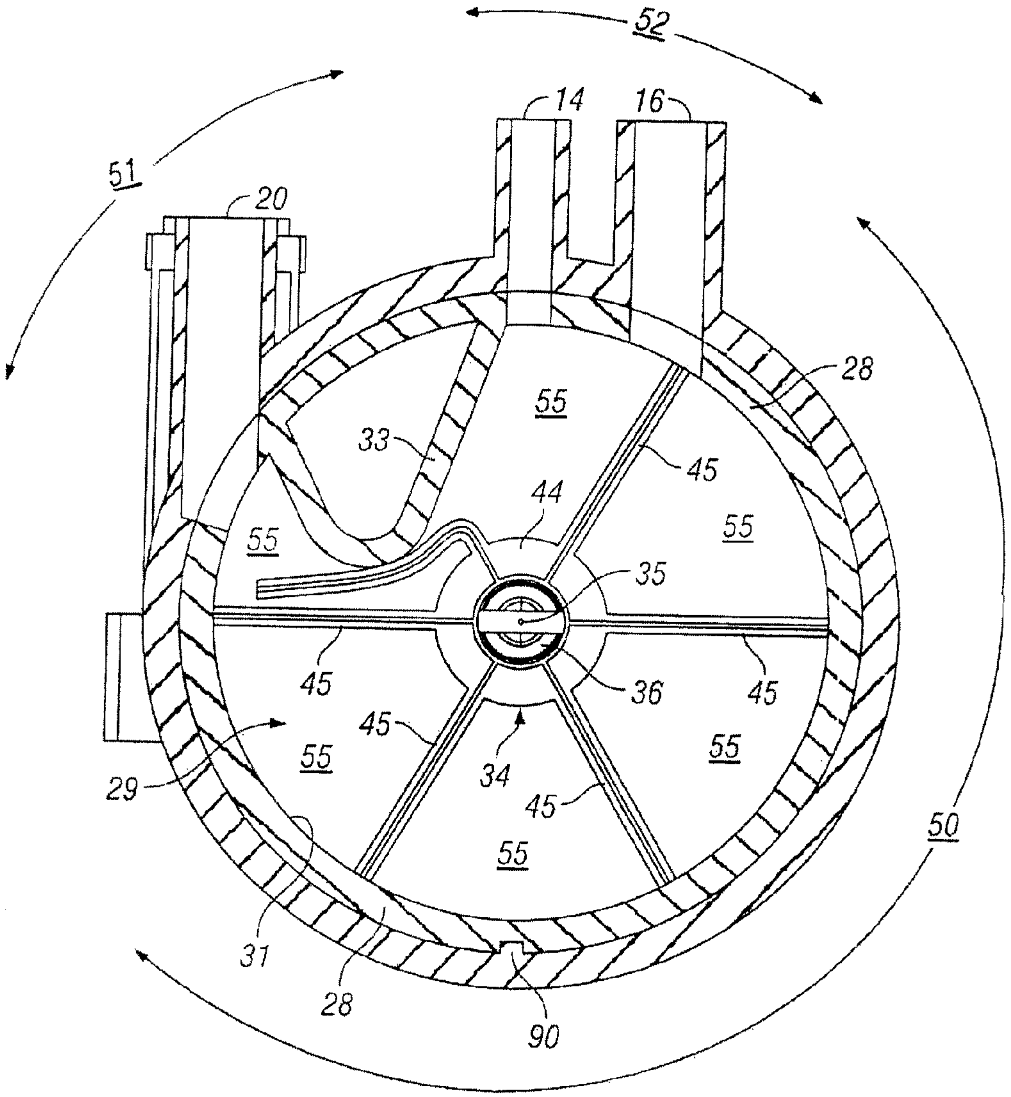
FIG. 5 is a front view in cross-section through the mixing pump shown in FIG. 2.

As seen in FIG. 2, the pump 12 has a rotor chamber-forming member 24 comprising a principal housing member 25 and a cap-like closure member 26. As seen in FIG. 4, which illustrates an exploded view of the components forming the mixing pump 12, a compartment 27 is defined inside the housing member 25 within which a ring member 28 is provided located keyed thereto against rotation as by an axial key 90 which extends radially inwardly on the housing member 25 being received in a keyway slot 91 in the ring member 28. As seen in FIG. 5, an interior chamber 29 is defined inside the housing member 25 axially between an inner axially directed side wall 30 of the housing member 25 and an axially directed outer side wall 32 on the closure member 26, and radially inwardly of a radially inwardly directed end wall 31 of the ring member 28 which end wall 31 is at varying radial distances from a rotor axis 35.

A rotor member 34 is received in the interior chamber 29 journalled for rotation about the rotor axis 35 by being mounted on a rotor axle 36. FIG. 4 shows the rotor axle 36 as having an axially extending slot 79 open at an inner end which is adapted to be received in two complementary slot-like openings 46 through a central hub 44 of the rotor member 34. The rotor axle 36 may be slid axially through the rotor member 34 for coupling against relative rotation. An inner end of the rotor axle 36 has cylindrical bearing surfaces 37 coaxially about the rotor axis 35 for engagement with coaxial bearing surfaces in a blind bearing bore 98 formed in the inner side wall 30 of the housing member 25. The rotor axle 36 extends through a bearing opening 38 in the closure member 26 for coaxial journaling therein preferably in sealed engagement with the bearing opening 36 as, for example, by providing a resilient seal member such as an O ring 99 shown only in FIG. 12 within the bearing opening 38.

An outer end of the rotor axle 36 carries a coupling member 39 as for quick connection and disconnection with a driving mechanism to rotate the rotor axle 36.

FIG. 1 schematically illustrates an electric motor 62 which drives a first driven gear 63 which in turn drives a second gear 64 which in turn drive third gear 65 coupled the coupling member 39 of the rotor axle 36 of the mixing pump 12.

The rotor axle 36 preferably is a rigid unitary axle member which carries the coupling member 39 at an outer end and cylindrical bearing surfaces 37 at its inner end. The rotor axle 36 is adapted for coupling with the vaned rotor member 34 for rotation of the rotor member 34 in unison with the rotor axle 36.

The rotor member 34 has an axially extending central hub 44 with the axially extending openings 46 extending therethrough for receipt of and coupling to the rotor axle 36. A plurality of resilient vanes 45 extend radially outwardly from the central hub 44 with the vanes 45 spaced angularly from each other. Each vane 45 has an end surface 47 to be closely adjacent to or to engage the end wall 31 of the interior chamber 29, an inner side surface 48 to be closely adjacent to or engage the inner side wall 30 and an outer side surface 49 to be closely adjacent to or engage the outer side wall 32. The end wall 31 of the interior chamber 29 provided by the ring member 28 has a radial distance from the rotor axis 35 which varies circumferentially, that is, angularly about the rotor axis 35. As seen in FIG. 5, the radial distance or radius of the end wall 31 is shown to be relatively constant other than over bump section 33 where the radius is reduced.

Between each two adjacent vanes 46 and inside the end wall 31 and side walls 30 and 32, a vane chamber 55 is defined. The volume of each chamber 55 depends on the configuration that each of its two vanes assumes. In FIG. 5, the rotor member 35 is rotated clockwise. On one vane 45 first engaging the bump section 33, the vane is deflected reducing the volume of the vane chamber 55 following the deflected vane 55. The volume of that vane chamber 55 will decrease until the following vane 45 engages the bump section. The outlet 20 is open into any vane chamber 55 until the following vane 45 for that vane chamber 55 first engages the bump section. Thus, a discharge sector may be defined as that angular sector during which any vane chamber 55 is decreasing in volume and open to the outlet 20.

The discharge sector is shown as the angular sector 51.

For any vane chamber 55, once a leading vane 45 clears the bump section 33, as the trailing vane 45 moves down the clockwise side of the bump section 33, the volume of the vane chamber 55 will increase, until the trailing vane 45 clears the bump section. A suction sector arises during which any one vane chamber 55 increases in volume. The suction sector is shown as the angular sector 52.

Between the suction sector 52 and the discharge sector 51, there arises a mixing section 50 during which the volume of the vane chamber 55 is relatively constant and next open to any one of the air inlet 14, fluid inlet 16 or outlet 20.

The volume of each of the plurality of vane chambers 55 decreases in volume when each vane chamber 55 is open to the discharge section 51 and increases in volume when each vane chamber 55 is open to the suction section 52.

The air inlet 14 and the liquid inlet 16 are provided through the end wall 31 at an angular location where each vane chamber 55 is open to the suction sector 52.

The outlet 20 is provided through the end wall 31 at an angular location where each vane chamber 55 is open to the discharge sector 51.

With rotation of the rotor member 34, each vane chamber 55 will in sequence pass through the suction sector 52, then the mixing sector 50 and then the discharge sector 51. The increase in volume of each vane chamber in the suction section draws air into the vane chamber via the air inlet 14 and fluid into the vane chamber via the liquid inlet 16. In rotation of the vane chamber through the mixing sector, the air and fluid within the vane chamber experience some mixing as due at least partially to the higher density of the fluid compared to the air, due to the tendency of the fluid to flow downwardly under gravity and due to the relative orientation of the vanes forming the vane chamber coming to assume different relative vertical orientations. On each vane chamber 55 passing through the discharge sector 51 the decrease in vane volume will discharge air and fluid in the vane chamber out of the vane chamber through the outlet 20.

Preferably, as shown in the Figures, the rotor axis 35 is horizontal. The air inlet 14, liquid inlet 16 and the outlet 20 are provided in a vertical upper half of the chamber-forming member 26. This can be advantageous towards assisting in mixing since each vane chamber containing air and liquid rotates a significant angular extent from the suction sector 52 to the discharge sector 51, preferably, about 210 degrees in the preferred embodiment. Additionally, location of at least the air inlet 14 and outlet 20 in the vertical upper half of the chamber-forming member 26 is of assistance to avoid difficulty in fluid dripping out of the air inlet 14 or the outlet 20 when the mixing pump is not in use.

As shown in FIG. 1, the reservoir 18 is connected to the fluid inlet 16 as by a tube 15. The reservoir 18 may comprise a collapsible container such as a disposable plastic bag or may comprise a non-collapsible container in which air venting is preferably provided to avoid a vacuum being developed in the container which might prevent dispensing of fluid.

Figure 6:
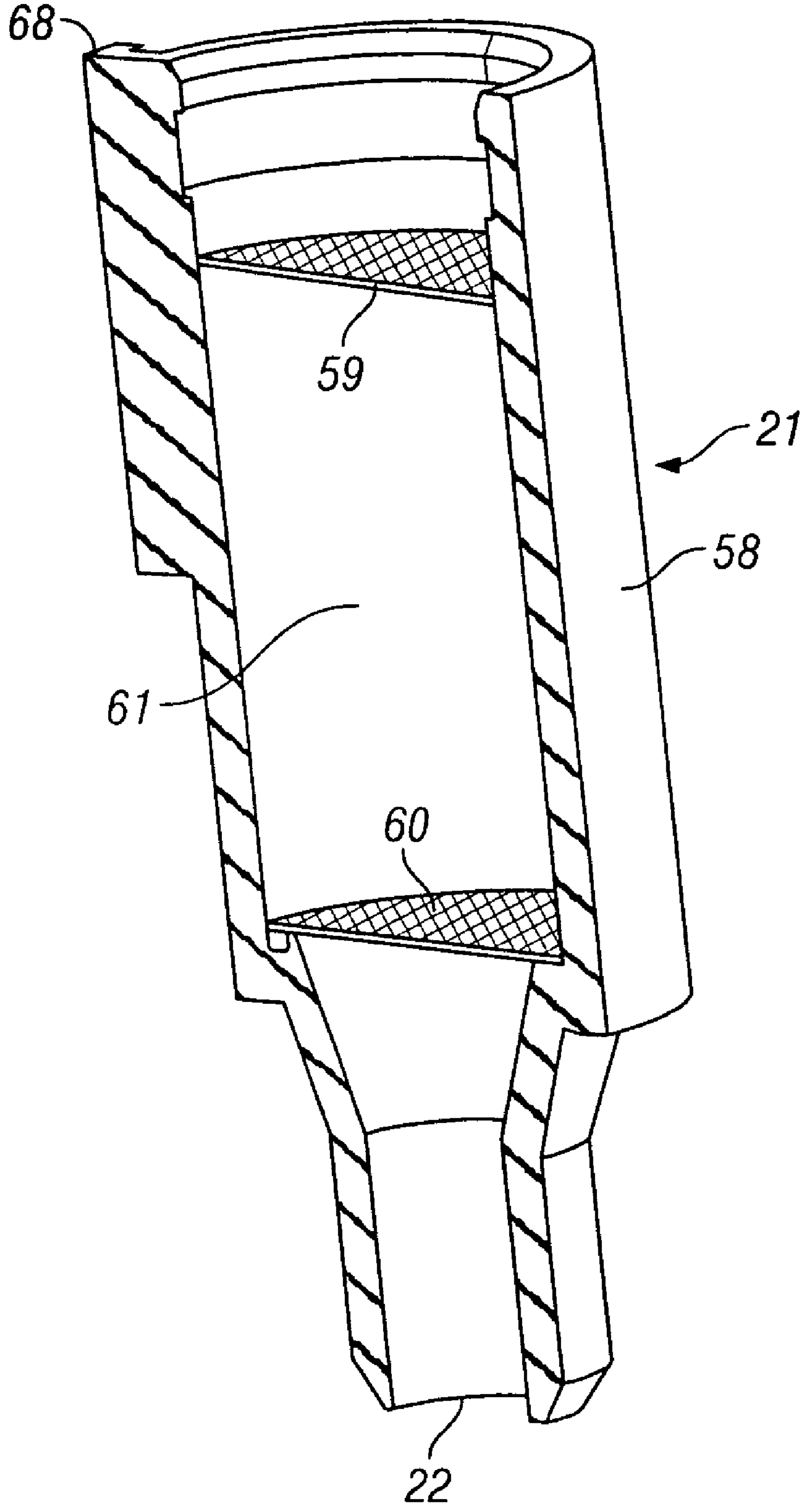
FIG. 6 is a vertical cross-sectional front view through the foam generator shown in FIG. 2.

The outlet 20 on the housing member 27 is shown as connected by an outlet tube 19 to an inlet to the foam generator 21. As seen in FIG. 6, the foam generator 21 comprises a rigid foaming tube 58 having a first screen 59 proximate an inlet end and a second screen 60 proximate an outlet end with a mixing chamber 61 formed between the screens 59 and 60. Each screen 59 and 60 is a foam inducing screen preferably fabricated of plastic, wire or cloth material or comprising, for example, a porous ceramic material. Each screen provides small apertures through which air and liquid may be simultaneously passed to aid foam production as by the production of turbulent flow through the small pores or apertures of the screen. Foam 23 produced in the foam generator 21 exits the discharge outlet 22.

In a preferred manner of operation, the foam dispensing apparatus 10 is incorporated as part of a dispensing apparatus including a mechanism for rotating the rotor axle 36 when dispensing is desired. Preferably, the rotor member 34 may be rotated as by the electric motor 62 for a desired period of time to dispense a desired amount of foam. For example, in an automated electronic dispenser, dispensing may be activated as by a user engaging an activation button or by a touchless sensor sensing the presence of a user's hand under the discharge outlet. A control mechanism then operates the electric motor 62 for a period of time rotating the rotor axle 36 and the rotor member 34 drawing air and fluid into the mixing pump 12 and forcing mixed air and fluid from the mixing pump to pass through the foam generator 21 and, hence, discharge foam from the foam generator 21 out of the discharge outlet 22 onto a user's hands.

The relative size of the vane chambers 55, the speed of rotation of the rotor member 34 and the length of time that the rotor member 34 is rotated can be used to dispense desired quantities of fluid and air as foam.

Rotation of the rotor member 34 may be selected to be at desired speeds. For example, preferred rotation is believed to be in the range of 50 to 300 revolutions per minute, more preferably, approximately 150 revolutions per minute. Such rotational speed may, for example, be accomplished by gearing to reduce the speed of the output from an electric motor. Rotation at these relatively lower speeds can be advantageous to decrease the wear of the rotor member 34 and increase the life of the mechanism.

While the rotor member 34 may be rotated by an electric member, it is to be appreciated at various manual lever mechanisms may be provided which on manual urging of a lever will cause, as via a rack structure, a rotation of a gearing arrangement for a suitable amount of rotation of the vane member 34 in a single inward stroke of a lever and with the lever to return to an unbiased start position as by the force of suitable return spring member acting on the lever.

Referring to FIG. 6, the foam tube 58 is shown as carrying a flange 68 at its side adapted for convenience to be mounted to one side of the housing member 27 by being engaged within a mounting slotway 69 provided on the housing member 27.

The rotor member 34 is preferably formed of a flexible elastomeric material which has a tendency to assume an inherent configuration and, when deflected, will return to the inherent position. Preferably, the rotor may be formed as from silicone type plastics, more correctly referred to as polymerized siloxanes in the form of elastomers, from fluoroelastomers such as those sold under the trade mark VITON, from elastomers such as thermoplastic elastomers also known as thermoplastic rubbers, preferably those which are relatively easy to use in manufacturing as by injection moulding.

Reference is made to FIGS. 7 to 12 which illustrate a second embodiment of mixing apparatus 10 in accordance with the present invention. The second embodiment of FIGS. 7 to 12 differs from the first embodiment in that two pumps are provided, a mixing pump 12 which is almost identical to the mixing pump 12 in the first embodiment and a fluid pump 112. The mixing pump 12 in the second embodiment is substantially identical to the mixing pump 12 in the first embodiment with the exception that the fluid inlet 16 in the first embodiment has been moved from being on a circumferential surface of the housing member 25 and is provided internally as an opening 116 through an intermediate partition 70 which serves to separate the interior chamber 29 of the mixing pump 12 from an interior chamber 129 of the fluid pump 112. Aside from this difference, the mixing pump 12 in the second embodiment of FIGS. 7 to 12 is substantially identical to the mixing pump 12 of FIGS. 1 to 6.

Figure 7:
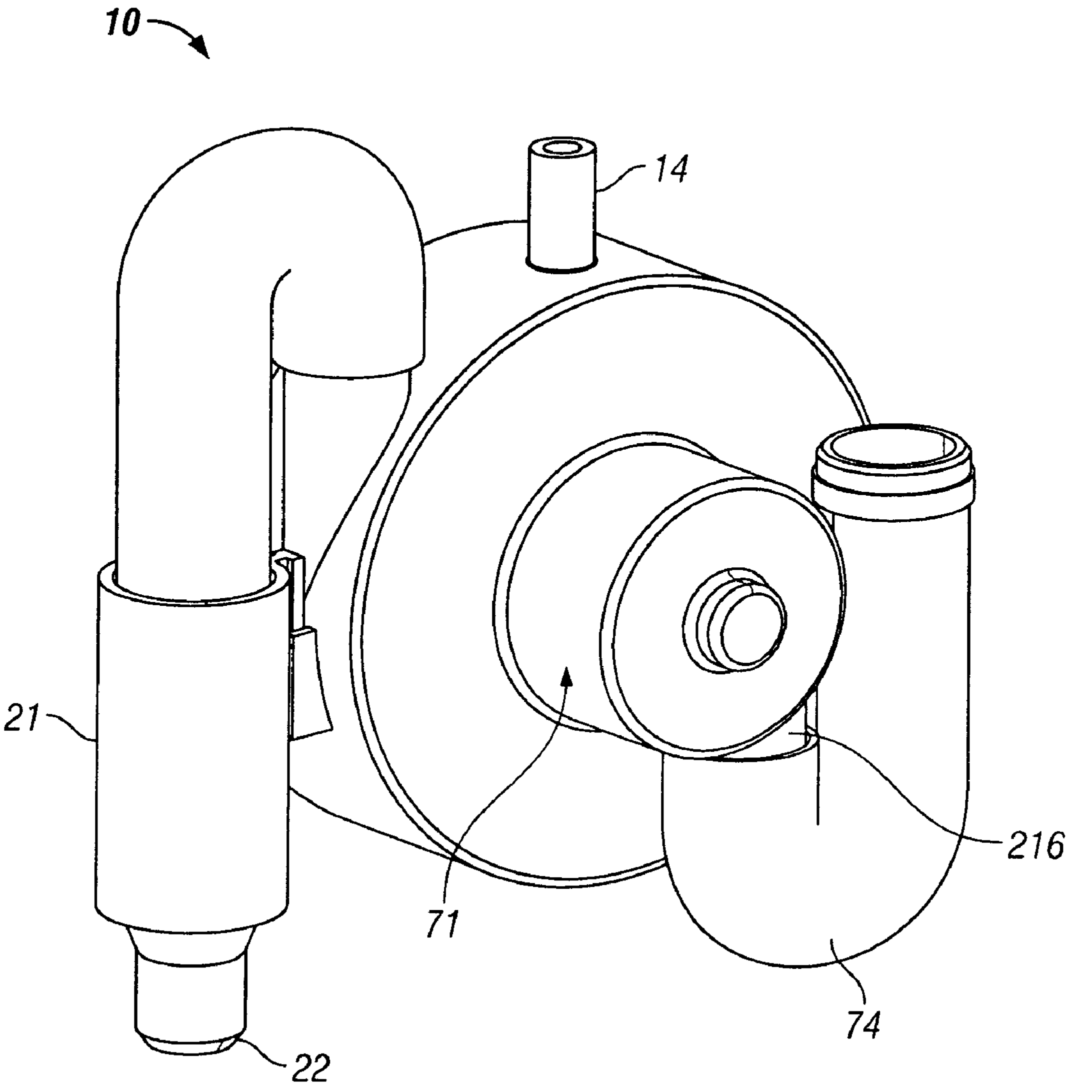
FIG. 7 is a rear pictorial view of a mixing pump and foam generator in accordance with a second embodiment of the invention.
Figure 8:
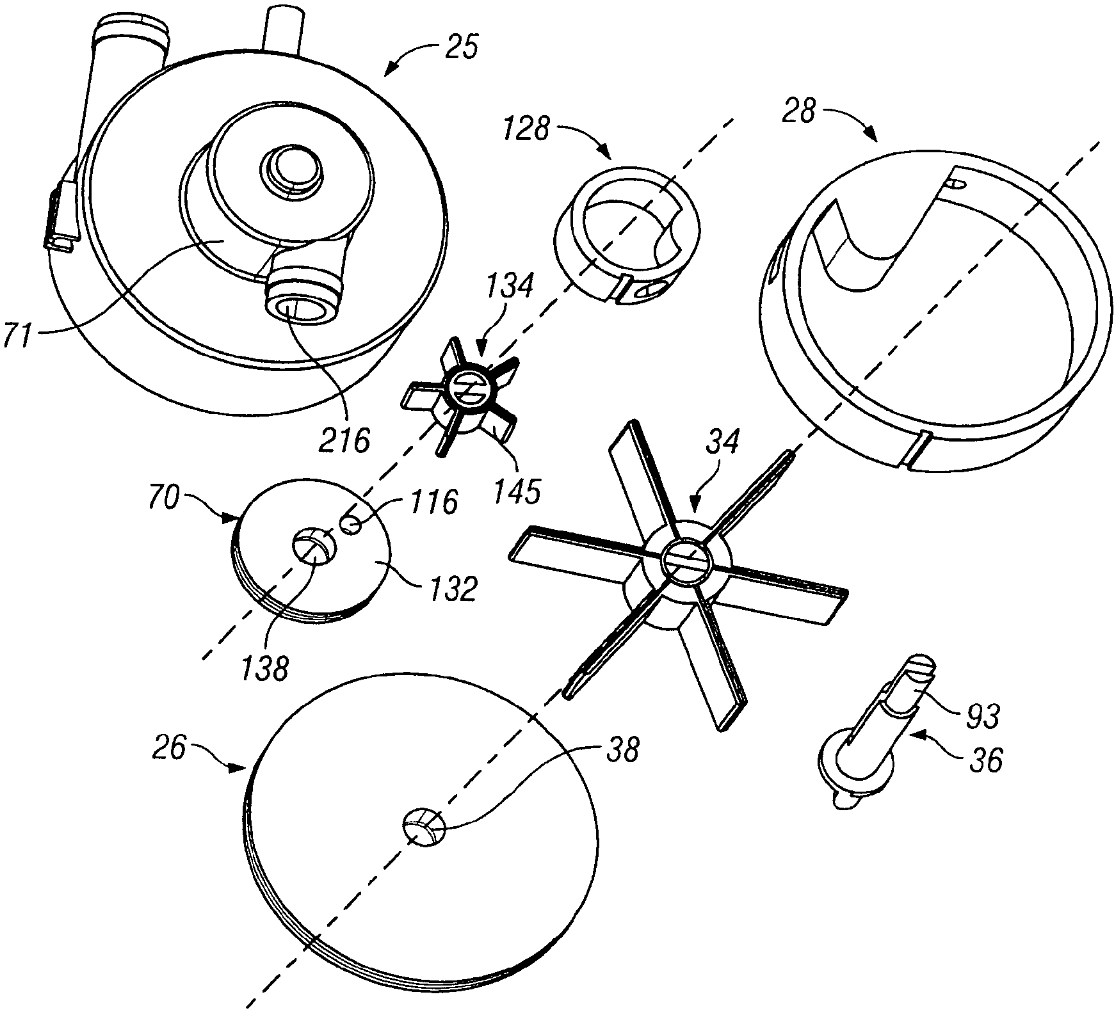
FIG. 8 is a rear perspective exploded view of the mixing pump of FIG. 7.
Figure 9:
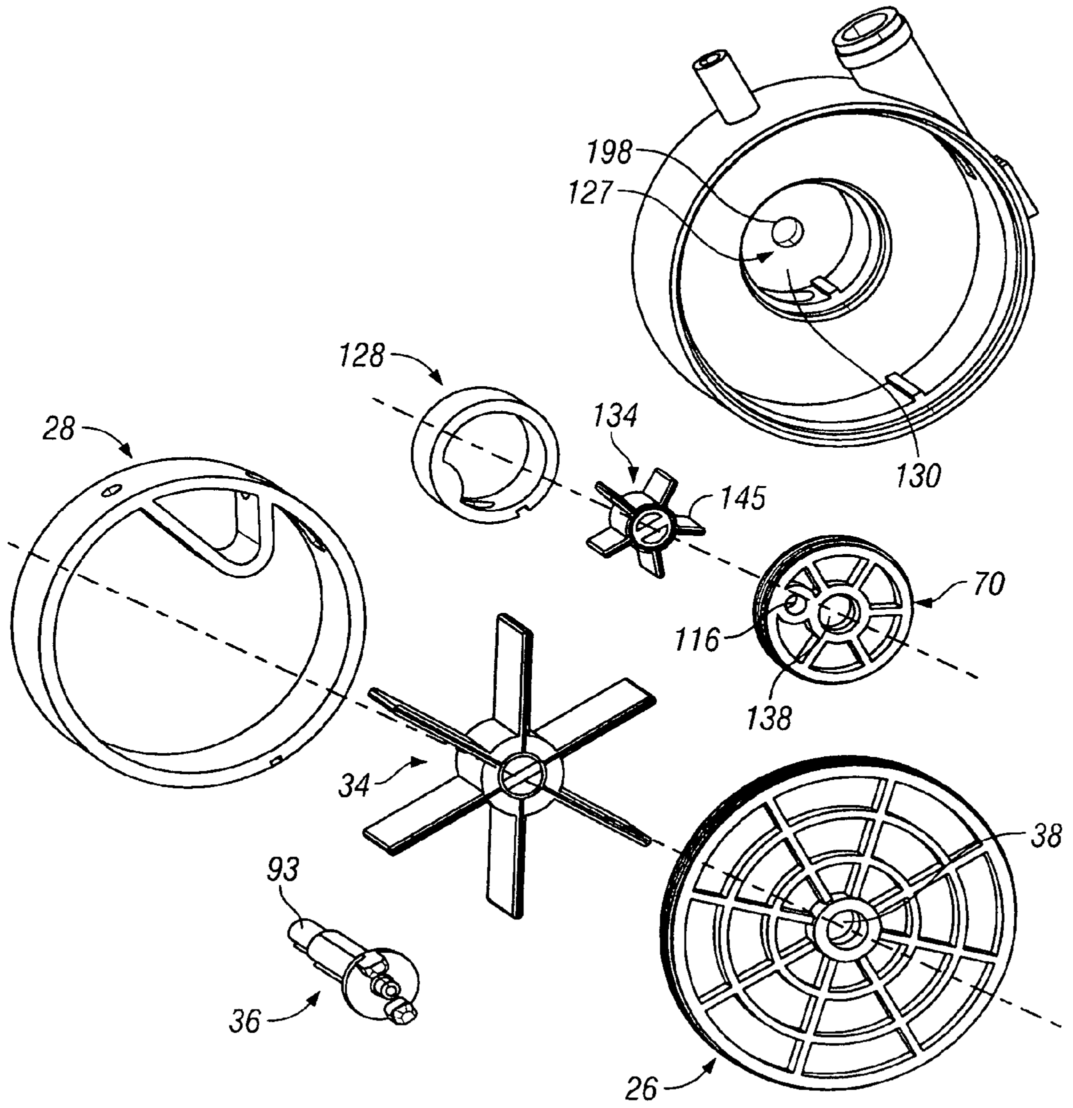
FIG. 9 is a front perspective exploded view of the mixing pump shown in FIG. 7.
Figure 10:
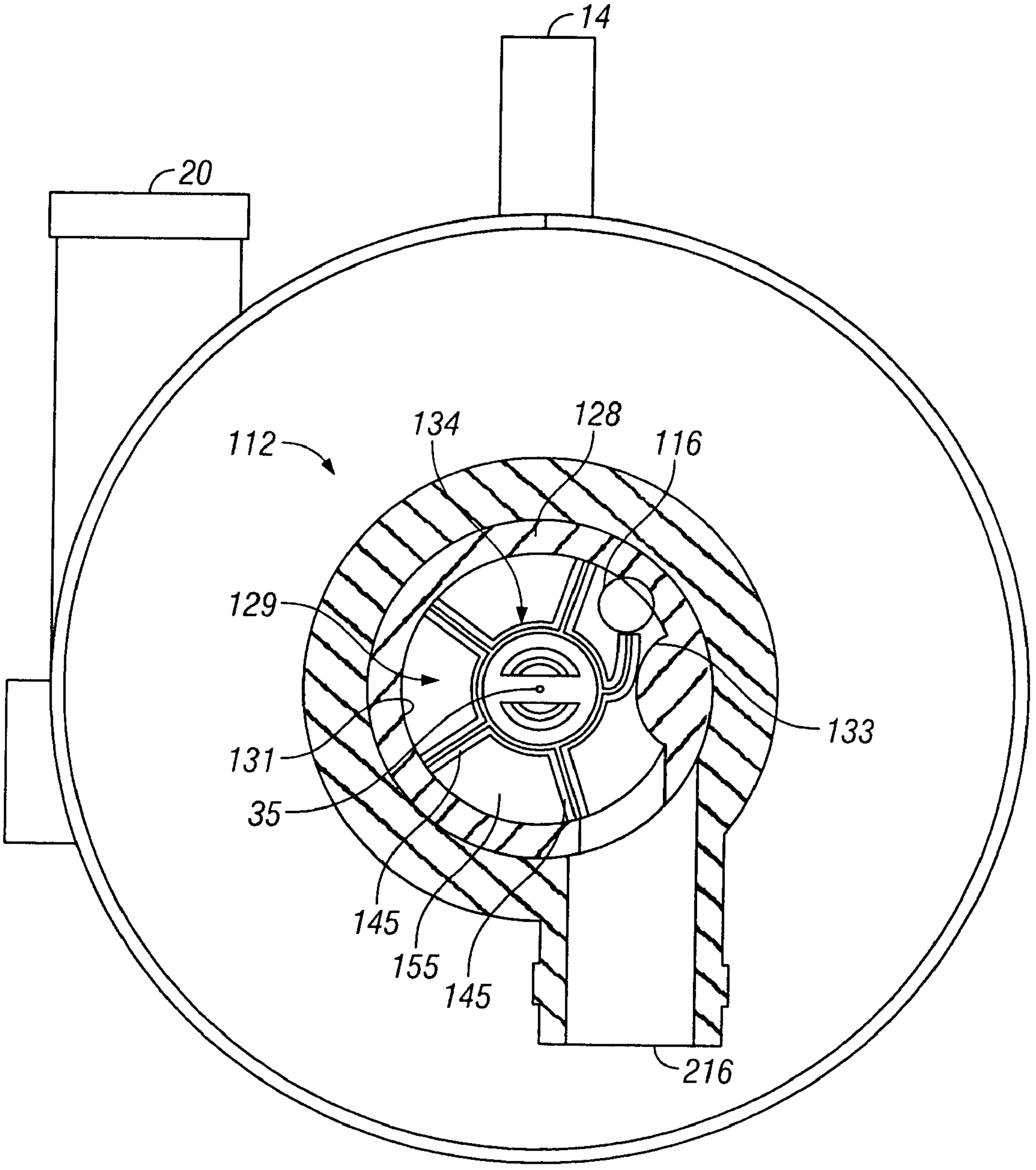
FIG. 10 is a cross-sectional vertical rear view of the pump shown in FIG. 7 through the smaller diameter fluid pump.

As seen in FIGS. 7, 8 and 9, the housing member 25 includes a cylindrical rearward extension 71 defining a compartment 127 within which a ring member 128 is located keyed against rotation. As seen in FIG. 10, an interior cavity 129 is defined having an inner axially directed side wall 130 and a circumferential radially directed end wall 131 of the ring member 128. The ring member 128 has a bump portion 133 over which the end wall 131 is of reduced radius from the rotor axis 35.

The intermediate partition 70 is adapted to be secured at an outer end of the inner interior chamber 129 to effectively form a partition and divide the inner interior chamber 129 of the fluid pump 112 from the outer interior chamber 29 of the mixing pump 12 with an inwardly directed side wall 132 of the intermediate partition 70 forming an axially inwardly directed side wall of the inner interior chamber 129.

The intermediate partition 70 is adapted to be fixedly secured in place against movement. Communication between the inner interior chamber 129 and the outer interior chamber 29 is provided through the axially extending opening 116 through the partition 70.

An inner rotor member 134 is adapted to be received inside the inner interior chamber 129 engaged on a reduced cylindrical portion 93 of the rotor axle 36. In the second embodiment, the rotor axle 36 is journalled in the opening 38 through closure member 26, is journalled in a central opening 138 in the intermediate partition 70 and is journalled by having its inner end received within the bore 198 provided in the inner side wall 130 of the inner interior chamber 129.

The fluid pump 112 has a fluid inlet 216 to be placed in communication with fluid in a reservoir as, for example, by the use of a U-shaped tubular elbow 74 shown in FIG. 7.

Figure 12:
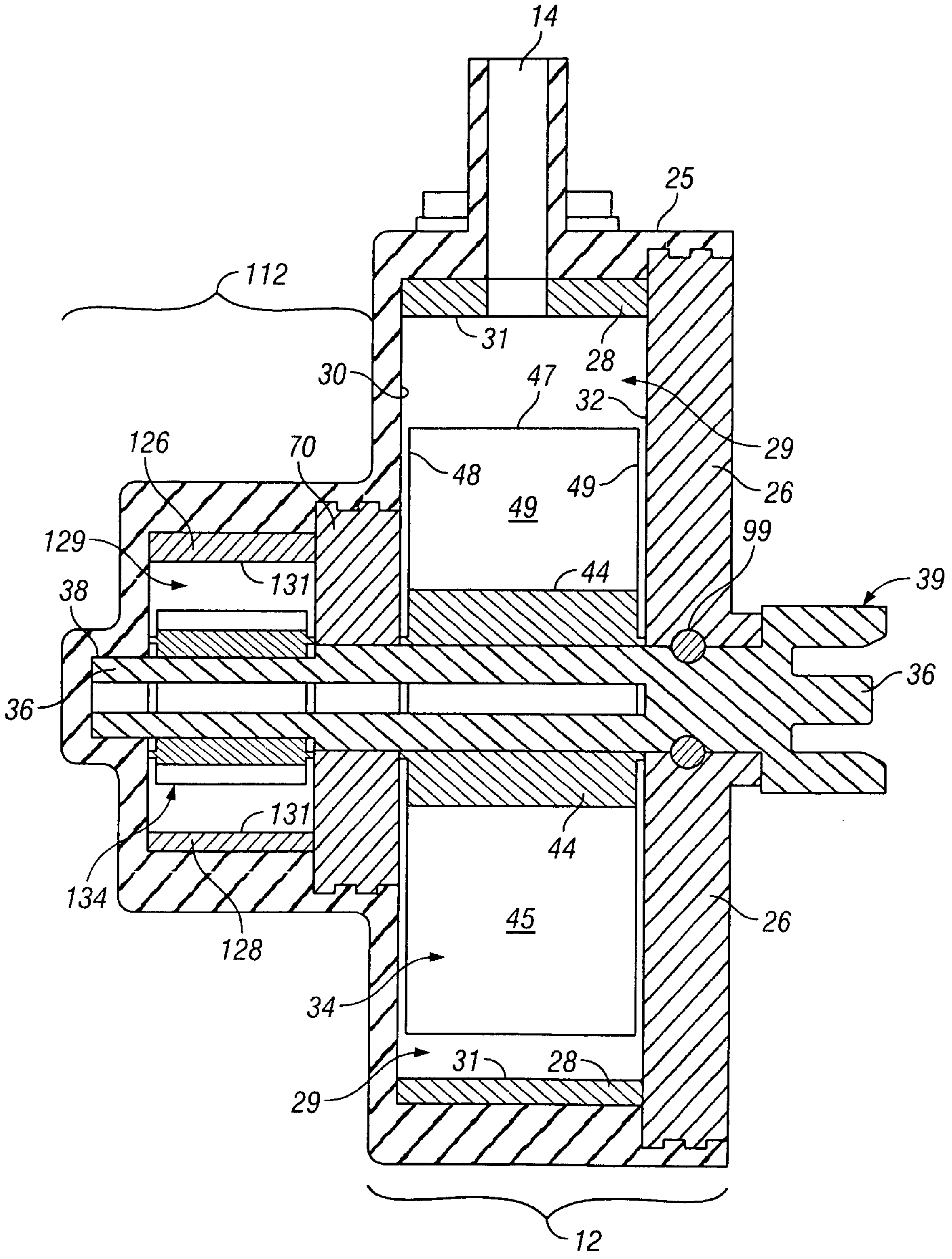
FIG. 12 is a vertical cross-sectional side view of the pump shown in FIG. 7.

FIG. 10 shows a cross-sectional vertical back view through the fluid pump 112. In FIG. 12, the rotor member 134 is to rotate clockwise with a suction section of the pump open to the liquid inlet 216 and a discharge section of the pump open to the axially extending opening 116 which serves as a fluid outlet for the fluid pump. While of smaller diameter, the vanes 145 on the rotor member 134 for the fluid pump 112 operate in the same manner as described with the rotor member 34 of the mixing pump. Thus, rotation of the rotor 134 of the fluid pump 112 will draw fluid from the reservoir and discharge it via opening 116 axially into the interior chamber 29 of the mixing pump 12.

Figure 11:
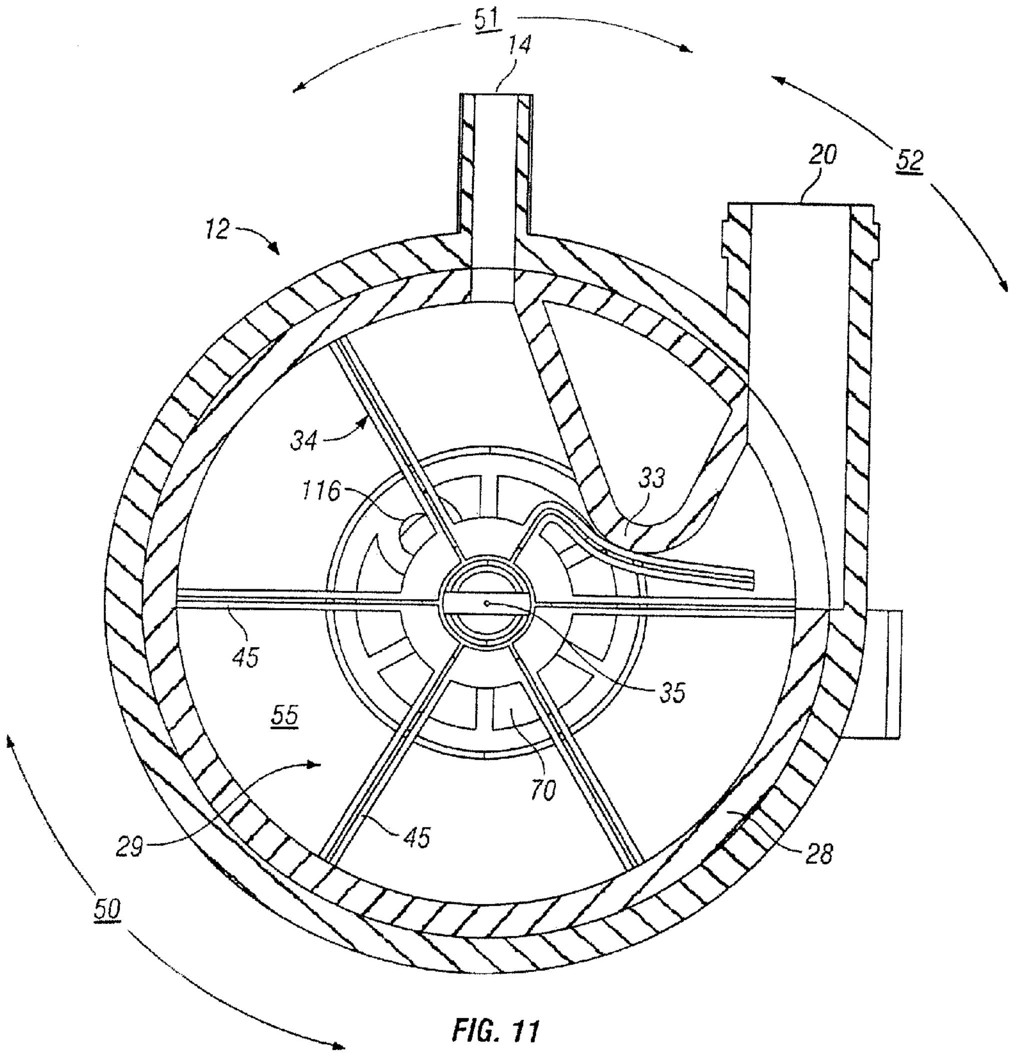
FIG. 11 is a cross-sectional vertical front view of the pump shown in FIG. 7 through the larger diameter mixing pump.

Reference is made to FIG. 11 which shows a vertical cross-section through the mixing pump 12 of FIG. 7 from the forward side. In FIG. 11, the rotor member 34 rotates counter-clockwise. The operation of the mixing pump 12 in FIG. 11 is identical to that described in the first embodiment, however, fluid is injected into the interior chamber 29 via the axially extending opening 116 through the partition 70 serving as the fluid inlet. The opening 116 is shown as being downstream from the air inlet 14. In operation of the mixing pump 12 as shown in FIG. 11, air from the air inlet 14 and fluid from the opening 116 are subsequently discharged in a discharge sector out of the outlet 20. In the context of FIG. 11, it is to be appreciated that the opening 116 need not be in a suction sector of the pump since fluid is injected from the liquid pump 112. However, it is believed that injecting the fluid from the fluid pump 112 is desired to be performed at a location far from the outlet 20 so as to permit a longer period of time for mixing of air and fluid in the vane chambers 55. Providing the opening 116 to be at a radially inwardly directed location in the vane chamber 55 is believed to be advantageous such that fluid which is ejected may, under gravity, attempt to flow downwardly mixing with air prior to the air and liquid being open to the outlet 20. In an analogous manner to that illustrated in FIG. 5, on FIG. 11, each of the mixing section 50, the discharge sector 51 and the suction 52 are marked on FIG. 11.

Reference is made to FIG. 12 which shows a vertical cross-section of the pump assembly of FIG. 7 in side view and illustrating how the rotor member 134 of the fluid pump 112 and the rotor member 34 of the mixing pump 12 are carried on the common rotor axle 36 for rotation in unison.

Relative sizing of the volumes of the vane chambers 155 of the fluid pump 112 compared to the volume of the vane chambers 55 of the mixing pump 12 may be selected having regard to various factors such as the viscosity of the fluid, the amount of air which may be desired or required to provide adequate foam. By simple experimentation, persons skilled in the art can develop the relative proportions and sizing of the various components of the mixing pump 12 and the fluid pump 112. Due to a larger volume of air which is required, it is generally preferred that the diameter of the rotor member 34 for the mixing pump 12 will be larger than the diameter of the rotor 134 of the fluid pump 112, however, this is not necessary and is to be appreciated that the relative volume of any vane chamber is increased by an increase in the axial length of the rotor member 34.

In accordance with the present invention, it is to be appreciated that the closure member 26 provides a substantially fluid impermeable seal firstly with the housing member 25 and, secondly, about the rotor axle 36. A seal which provides the same resistance to fluid flow is not necessary between the intermediate partition 70 and the rotor axle 36 since any leakage would result in the passage of fluid from the inner interior chamber 129 of the fluid pump 112 into the interior chamber 29 of the mixing pump 12.

In accordance with the preferred embodiment illustrated in FIG. 2, the housing member 25 is preferably injection moulded as from plastic as a single member preferably with a separate closure member 26 and, in the case of the embodiment illustrated in FIG. 7, a separate internal partition 70.

The preferred embodiments illustrate removable ring members 28 and 128 to be provided within the housing member 25 so as to provide the desired radially directed end walls 31 and 131 for the respective mixing pump 12 and fluid pump 112 to be of a desired configuration. Separate such ring members are not necessary and it is to be appreciated that the pump could be configured such that the end walls are integrally formed as portions of the housing member 25. Providing a separate ring member is believed to be advantageous such that these ring members may be precisely formed to have desired surfaces for engagement with the vanes and may have a desired profile. As well, provisions of a separate ring member lets the ring member be removable as can permit different ring members to be provided to accommodate different pumping characteristics as by, for example, suitably adjusting one or both of the ring members and/or suitably adjusting one or both of the rotors.

As to the nature of the fluid 17 to be provided in the reservoir 18, it is desired this fluid be a foamable fluid, that is, a fluid which is capable of foaming as when passed through the porous screens simultaneously with air. The fluid may preferably comprise a liquid, however, that may include suspensions and slurries which may include a particulate matter. The fluids may comprise water-based soaps and water and/or alcohol based cleaning solutions. The resultant foam may be suitable, for example, for cleaning, disinfecting, shaving, for use in decoration or insulating or as used as an edible food product.

In accordance with the present invention such as illustrated in the second embodiment, a two stage pumping arrangement is provided. A fluid pump is provided to inject fluid 17 from the reservoir 18 into the mixing pump. The nature of the fluid pump is not limited and it may comprise any manner of pump or other mechanism that provides for injection of the fluid 17 into the mixing pump 12. In accordance with the second embodiment, it is preferred and believed to be advantageous to provide both the fluid pump 112 and the mixing pump 12 as having a common axis and to be driven by the same motor. It is to be appreciated, however, that the fluid pump may comprise a different pump than a rotary vane pump and may comprise any manner of pump such as, for example, a positive displacement rotary pump having pumping lobes. The nature of such pump or the mechanism for pumping is not limited. For example, injection of the fluid into the mixing pump 12 could be accomplished by pressurizing the reservoir 18 and controlling the flow of the fluid into the mixing pump 12, as when the mixing pump 12 is being operated.

In accordance with the present invention, it is preferred that the air and fluid be mixed within the mixing pump after the air and fluid become disposed within the mixing pump and prior to their discharge from the mixing pump. It is preferred, therefore, that the angular distance in the rotary vane mixing pump during which both the air and liquid are received in the interior cavity 29 and until they are discharged from the outlet 20 may be over a significant angular extent in the rotation of the rotary member 34. Preferably, mixing may occur for at least 120, more preferably, at least 180, more preferably, at least 210 degrees of angular rotation of the rotary member 34 towards enhancing the mixing of the air and fluid before the mixture is discharged via the outlet 20 into the foam generator 21.

Insofar as in the first embodiment the suction developed in the suction sector of the mixing pump is to draw the liquid 17 into the mixing pump 12, then it is desired that the liquid inlet 16 be open to the suction sector of the mixing pump 12. However, insofar as the fluid 17 is to be injected via a liquid inlet into the mixing pump 12, then it is to be appreciated that the liquid inlet need merely be upstream of the outlet 20 or the discharge sector of the mixing pump 12. Insofar as the liquid inlet is upstream of the discharge sector, then at least some mixing of the air and liquid should occur prior to their discharge from the outlet 20.

The second embodiment illustrated in FIGS. 7 to 12 shows a single stage compression of the air from atmosphere and double stage or two-phase pumping of the fluid.

While the invention has been described with reference to preferred embodiments, many modifications and variations will now occur to a person skilled in the art. For a definition of the invention, reference is made to the following claims.

We claim:

1. A dispenser for dispensing foam comprising:

a positive displacement rotary vane mixing pump having:

a rotor chamber-forming member having an interior chamber defined by interior chamber walls, and a rotor journalled for rotation about a rotor axis inside the interior chamber;

the rotor having a plurality of vanes extending outwardly radially relative the rotor axis for engagement with the chamber walls;

the vanes extending from the rotor circumferentially spaced from each other about the rotor axis;

a plurality of vane chambers, each vane chamber formed between two respective adjacent vanes and the chamber walls;

wherein, in each rotation of the rotor about the rotor axis in the interior chamber, each pair of adjacent vanes passes through a suction sector of the interior chamber and a discharge sector of the interior chamber and wherein in movement of each two adjacent vanes through the suction sector the respective vane chamber increases in volume, and in movement of each two adjacent vanes through the discharge sector the respective vane chamber decreases in volume;

an air inlet into the suction sector of the interior chamber, a fluid inlet into the interior chamber upstream of the discharge sector, an outlet from the discharge sector of the interior chamber, a reservoir for a fluid capable of foaming in communication with the fluid inlet of the mixing pump, the outlet in communication with a discharge opening, a foam generator between the outlet of the interior chamber and the discharge outlet in which on air and the fluid passing through the foam generator produces foam, a fluid pump between the reservoir and the fluid inlet to inject fluid through the fluid inlet, the fluid pump includes a positive displacement rotary vane fluid pump having:

a rotor chamber-forming member having an interior chamber defined by interior chamber walls, and a rotor journalled for rotation about a rotor axis inside the interior chamber;

the rotor having a plurality of vanes extending outwardly radially relative the rotor axis for engagement with the chamber walls;

the vanes extending from the rotor circumferentially spaced from each other about the rotor axis;

a plurality of vane chambers, each vane chamber formed between two respective adjacent vanes and the chamber walls;

wherein, in each rotation of the rotor about the rotor axis in the interior chamber, each pair of adjacent vanes passes through a suction sector of the interior chamber and a discharge sector of the interior chamber and wherein in movement of each two adjacent vanes through the suction sector the respective vane chamber increases in volume, and in movement of each two adjacent vanes through the discharge sector the respective vane chamber decreases in volume;

a fluid inlet into the suction sector of the interior chamber of the fluid pump in communication with the reservoir, a fluid outlet from the discharge sector of the interior chamber of the fluid pump in communication with the fluid inlet of the mixing pump, the rotor axis of the mixing pump and the rotor axis of the fluid pump are coaxial, the rotor of the mixing pump and the rotor of the fluid pump are coupled for rotation together, the interior chamber of the mixing pump is adjacent the interior chamber of the fluid pump with an intermediate partition member therebetween defining on a first axially directed side a portion of the interior chamber walls of the interior chamber of the mixing pump and on a second axially directed side a portion of the interior chamber walls of the interior chamber of the fluid pump, an opening extending axially through the partition comprising both the fluid outlet from the discharge sector of the interior chamber of the fluid pump and the fluid inlet into the suction sector of the interior chamber of the mixing pump.

2. A dispenser as claimed in claim 1 wherein the fluid is injected through the fluid inlet at a pressure above atmospheric pressure.

3. A dispenser as claimed in claim 1 including:

a pump housing comprising a unitary element formed from plastic defining the chamber-forming member of one of the mixing pump and fluid pump but for the partition and forming the chamber-forming member of the other of the mixing pump and fluid pump but for a closure member which closes an axially extending access opening into the interior chamber walls of the interior chamber of the other of the mixing pump and the fluid pump, the closure member defining an axially directed portion of the interior chamber walls of the interior chamber of said other of the mixing pump and the fluid pump, the access opening, when not closed by the closure member, permitting assembly of the mixing pump and fluid pump by passage therethrough the rotor of the mixing pump, the partition and the rotor of the fluid pump.

4. A dispenser as claimed in claim 3 wherein the rotor of said other of the mixing pump and fluid pump extends axially through the closure member and is adapted for coupling to impart rotation thereof.

5. A dispenser as claimed in claim 4 wherein the rotor of the mixing pump and the rotor of the fluid pump have rigid axle portions which are coupled together and journalled for rotation coaxially of the rotor axes by engagement with bearing surfaces coaxial with the rotor axes and provided on one or more of: (a) the partition, (b) the closure member and (c) the pump housing at an axially inner end of the interior chamber of said one of the mixing pump and second pump.

6. A dispenser as claimed in claim 5 wherein:

the interior chamber walls of the interior chamber of the fluid pump extend radially from the rotor axes a lesser extent than the interior chamber walls of the interior chamber of the mixing pump, the chamber-forming member of the mixing pump having the access opening.

7. A dispenser as claimed in claim 1 wherein the foam generator comprises a porous member for generating turbulence in fluid passing therethrough to generate foam when air and liquid pass therethrough simultaneously.

8. A dispenser as claimed in claim 1 wherein on the mixing pump the air inlet is disposed at a height above the fluid inlet.

9. A dispenser as claimed in claim 1 wherein in the mixing pump, in rotation of the rotor of the interior chamber the air inlet becomes open to any one vane chamber of the mixing pump in the suction section before the fluid inlet of the mixing pump becomes open to that same one vane chamber.

10. A dispenser as claimed in claim 1 wherein the rotor axes are generally horizontal.

11. A dispenser as claimed in claim 10 wherein fluid inlet of the mixing pump is located radially inwardly of the outlet of the mixing pump.

12. A dispenser as claimed in claim 11 wherein fluid inlet of the mixing pump is located radially inwardly of the air inlet of the mixing pump.

13. A dispenser as claimed in claim 1 wherein in the mixing pump from a rotational position in the suction sector which a vane chamber receives input from both air inlet and the fluid inlet to a position which the same vane chamber is open to the outlet, the rotor of the mixing pump rotates at least 180 degrees about the rotor axis.

14. A dispenser as claimed in claim 13 wherein in the mixing pump each of the air inlet, the fluid inlet and the fluid outlet are in an upper half of the interior chamber.

15. A dispenser as claimed in claim 1 including a fluid pump between the reservoir and the fluid inlet to inject fluid through the fluid inlet at a flow rate determined by a rate of rotation of the rotor of the mixing pump.

16. A dispenser for dispensing foam comprising:

a positive displacement rotary vane mixing pump having:

a rotor chamber-forming member having an interior chamber defined by interior chamber walls, and a rotor journalled for rotation about a rotor axis inside the interior chamber;

the rotor having a plurality of vanes extending outwardly radially relative the rotor axis for engagement with the chamber walls;

the vanes extending from the rotor circumferentially spaced from each other about the rotor axis;

a plurality of vane chambers, each vane chamber formed between two respective adjacent vanes and the chamber walls;

wherein, in each rotation of the rotor about the rotor axis in the interior chamber, each pair of adjacent vanes passes through a suction sector of the interior chamber and a discharge sector of the interior chamber and wherein in movement of each two adjacent vanes through the suction sector the respective vane chamber increases in volume, and in movement of each two adjacent vanes through the discharge sector the respective vane chamber decreases in volume;

an air inlet into the suction sector of the interior chamber, a fluid inlet into the interior chamber upstream of the discharge sector, an outlet from the discharge sector of the interior chamber, a reservoir for a fluid capable of foaming in communication with the fluid inlet of the mixing pump, the outlet in communication with a discharge opening, a foam generator between the outlet of the interior chamber and the discharge outlet in which on air and the fluid passing through the foam generator produces foam, a fluid pump between the reservoir and the fluid inlet to inject fluid through the fluid inlet, the fluid pump includes a positive displacement rotary vane fluid pump having:

a rotor chamber-forming member having an interior chamber defined by interior chamber walls, and a rotor journalled for rotation about a rotor axis inside the interior chamber;

the rotor having a plurality of vanes extending outwardly radially relative the rotor axis for engagement with the chamber walls;

the vanes extending from the rotor circumferentially spaced from each other about the rotor axis;

a plurality of vane chambers, each vane chamber formed between two respective adjacent vanes and the chamber walls;

wherein, in each rotation of the rotor about the rotor axis in the interior chamber, each pair of adjacent vanes passes through a suction sector of the interior chamber and a discharge sector of the interior chamber and wherein in movement of each two adjacent vanes through the suction sector the respective vane chamber increases in volume, and in movement of each two adjacent vanes through the discharge sector the respective vane chamber decreases in volume;

a fluid inlet into the suction sector of the interior chamber of the fluid pump in communication with the reservoir, a fluid outlet from the discharge sector of the interior chamber of the fluid pump in communication with the fluid inlet of the mixing pump, the rotor axes are generally horizontal, the fluid inlet of the mixing pump is located radially inwardly of the outlet of the mixing pump.

17. A dispenser as claimed in claim 16 wherein the fluid inlet of the mixing pump is located radially inwardly of the air inlet of the mixing pump.

18. A dispenser as claimed in claim 16 wherein on the mixing pump the air inlet is disposed at a height above the fluid inlet.

19. A dispenser as claimed in claim 16 wherein in the mixing pump, in rotation of the rotor of the interior chamber the air inlet becomes open to any one vane chamber of the mixing pump in the suction section before the fluid inlet of the mixing pump becomes open to that same one vane chamber.

20. A dispenser as claimed in claim 18 wherein in the mixing pump, in rotation of the rotor of the interior chamber the air inlet becomes open to any one vane chamber of the mixing pump in the suction section before the fluid inlet of the mixing pump becomes open to that same one vane chamber.

21. A dispenser as claimed in claim 16 wherein the fluid is injected through the fluid inlet at a pressure above atmospheric pressure.

* * * * *